Temperature characteristic of titanium wet electrolytic capacitors

Electrolytes
1. 60% $KNO_2$ solu.
2. 40% $NaNO_3$ solu.

Inventors
Shinichi Minami
Koreaki Nakada
Wataru Mizushima
By Stevens, Davis, Miller & Mosher
ATTORNEYS

3,323,026
SLUG-TYPE TITANIUM WET ELECTROLYTIC CAPACITORS
Shinichi Minami, Osaka, Koreaki Nakada, Nishinomiya-shi, and Wataru Mizushima, Neyagawa-shi, Japan, assignors to Matsushita Electric Industrial Co., Ltd., Osaka, Japan, a corporation of Japan
Filed July 29, 1964, Ser. No. 385,886
7 Claims. (Cl. 317—230)

The present invention relates to slug-type wet electrolytic capacitors with a positive electrode of titanium.

The primary object of the present invention is to provide a slug-type titanium wet electrolytic capacitor which has a high capacitance value and various other excellent characteristics in spite of small size.

According to the present invention, there is provided a slug-type titanium wet electrolytic capacitor comprising, as the positive electrode, a sintered slug of titanium powder having thereon an oxide film, an electrolyte consisting of potassium nitrite and water, a piece of iron as the negative electrode, a suitable amount of paper spacers, and an outer casing of iron enclosing therein the positive electrode, the electrolyte, the negative electrode and the spacers.

Figure 1:
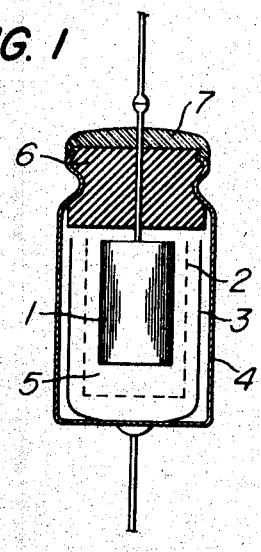
Figure 2:
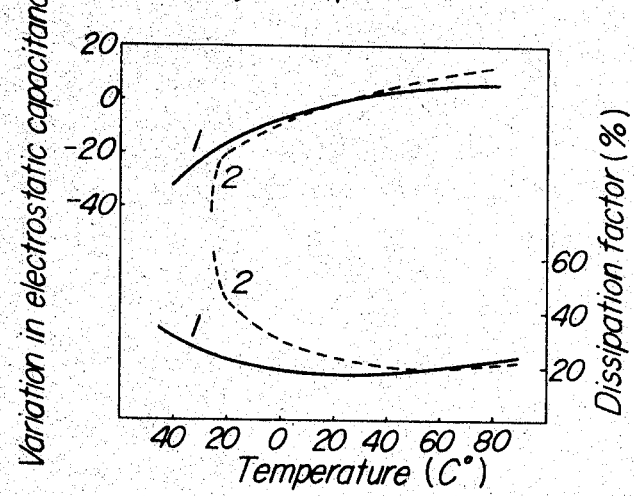

There are other objects and particularities of the invention which will become obvious from the following description with reference to the drawings, in which:

FIG. 1 is a schematic longitudinal sectional view of a slug type wet electrolytic capacitor embodying the invention; and FIG. 2 is a graphic representation of the temperature characteristic of the inventive electrolytic capacitor compared with that of a similar capacitor having an electrolyte of sodium nitrate solution.

The application of a slug type positive electrode to wet electrolytic capacitors has made a marked contribution towards the reduction of sizes of these capacitors. However, various contrivances have generally been required in the manufacture of capacitors of this type in order to simultaneously satisfy the merit of great capacitance values in spite of small sizes and desired characteristics in terms of dissipation factor, leakage current, working temperature range, life and others.

Slug-type wet electrolytic capacitors, which were heretofore widely used, comprise three principal elements, that is, a positive electrode formed from a sintered block of a metal having a valve action, such as tantalum or niobium, an electrolyte and a negative electrode, and in most cases, the negative electrode was substituted by a metal casing.

The present invention proposes a slug-type wet electrolytic capacitor of novel structure having a positive electrode of metallic titanium. The positive electrode metal of the capacitor according to the invention is advantageous over tantalum and niobium in that it is less expensive, lower in the specific gravity and greater in the dielectric constant of an anodic oxidation film thereof, and in that powdered metallic titanium can be sintered at a temperature lower than that of tantalum and niobium. As the case of tantalum, niobium and aluminum, an oxidation film forms on metallic titanium when it is subjected to anodic (electrolytic) oxidation in a suitable electrolyte. An aqueous solution of salts is mainly used as an electrolytic bath for anodic oxidation in the case of aluminum and tantalum. In the case of titanium, however, an oxidation film capable of withstanding high voltage can be obtained by the use of a so-called non-aqueous solution in which a salt such as ammonium borate is dissolved in an organic solvent such as ethylene glycol, glycerine or formamide. Alternatively, an electrolytic bath of a molten salt, which is prepared by heating to melt a nitrate such as sodium nitrate or potassium nitrate, or an inorganic salt other than these, may be used for anodic oxidation of titanium. In this latter case, an oxidation film thus obtained has a property different from that of the case wherein the formation is effected in the non-aqueous solution.

For example, 100 grams of ammonium borate may be dissolved in 1 liter of ethylene glycol to provide a non-aqueous solution and a positive electrode plate of titanium is subjected to anodic oxidation in the solution for one hour at a formation voltage of 60 volts. The product of electrostatic capacity and formation voltage per unit area of an anodic oxidation film so obtained is 10 $\mu$f./v./cm.$^{-2}$, and the oxide, when determined by the method of electron diffraction, has an amorphous structure. On the other hand, a positive electrode plate of titanium is soaked in a molten salt (in the form) of sodium nitrate at a temperature of 310° C. and is similarly subjected to anodic oxidation for one hour at a formation voltage of 60 volts. The product of electrostatic capacity and formation voltage in an anodic oxidation film so obtained is of the order of 35 $\mu$f./v./cm.$^{-2}$, and the film, when determined by the method of electron diffraction, is found to include titanium dioxide of rutile type structure. Thus, it is possible to obtain a sintered positive electrode of titanium as in the case of tantalum, and yet a sintering temperature of the order of 1,000° C. suffices for titanium, whereas a high sintering temperature of more than 1,600° C. is required for tantalum.

Taking advantage of the properties of titanium and the anodic oxidation film of titanium as described above, it is possible to manufacture a wet electrolytic capacitor which has a high electrostatic capacity per unit area. Or more precisely, powdered titanium is molded by compression and heated in a vacuum to obtain a sintered porous titanium positive electrode of porous nature. When this titanium positive electrode is subjected to anodic oxidation in a molten salt, for example, in a melt of sodium nitrate, the product of electrostatic capacity and formation voltage per unit volume of the sintered positive electrode shows a value of 40,000 $\mu$f./v./cm.$^{-3}$. An important problem which arises in connection with assembling a wet electrolytic capacitor by the use of such electrode is selection of an electrolyte to be employed therewith. The electrolyte must be impregnated in the porous electrode to fill pores therein until it reaches the formation film in the electrode. In order therefore to obtain a capacitor with a small dissipation factor, an electrolyte having an extremely high electrical conductivity must be selected to minimize a value of series resistance by the electrolyte. Needless to say, the electrolyte must not exert a corroding action on the titanium and the anodic oxidation film of titanium, but may preferably promote the formation of the oxide on weak points of the oxidation film when a working voltage is applied thereto. Further, the electrolyte must have a low freezing point, and by the use of such electrolyte, it is possible to obtain a wet electrolytic capacitor having a wide working temperature range on the low temperature side.

In conventional tantalum wet electrolytic capacitors, sulfuric acid or an aqueous solution of lithium chloride is generally used as an electrolyte. When, however, such electrolyte is employed in a titanium electrolytic capacitor, the oxidation film of titanium is gradually corroded by the electrolyte and the capacitor will not last for a long time. There are a limited number of electrolytes successfully usable for the slug-type titanium wet electrolytic capacitor. In other words, the number of electrolytes which have a low electrical resistance, which are usable at a low temperature and which do not have any corroding action on the oxidation film of titanium are limited. Among those electrolytes, the inventors selected those as enumerated in Table 1 and manufactured several samples of capacitors of the type.

TABLE 1.—PROPERTIES OF ELECTROLYTES

| Electrolyte | Concentration (weight percent) | Specific resistance at 25°C. (Ω·cm.) | Freezing point (°C.) |
|---|---|---|---|
| Aqueous solution of— | | | |
| $NaNO_3$ | 20 | 6.9 | 6 below zero. |
| $NaNO_3$ | 40 | 5.3 | 10 below zero. |
| $NH_4NO_3$ | 20 | 4.6 | 5.5 below zero. |
| $NH_4NO_3$ | 40 | 3.1 | 16 below zero. |
| $HNO_3$ | 30 | 1.3 | 36 below zero. |
| $KNO_2$ | 20 | 4.8 | 7.5 below zero. |
| $KNO_2$ | 55 | 2.9 | 22 below zero. |
| $KNO_2$ | 70 | 3.6 | 31 below zero. |

It will be seen from Table 1 that the aqueous solution of sodium nitrate or ammonium nitrate has a relatively high freezing point, although it does not exert any corroding action on the oxidation film of titanium. Therefore, capacitors containing the electrolyte in the form of the aqueous solution of sodium nitrate or ammonium nitrate do not function at all at a temperature below −20° C. While the aqueous solution of nitric acid is satisfactory in respect to its electrical conductivity and freezing point and is usable in the vicinity of −40° C., it exerts a corroding action on the oxidation film of titanium. For example, a capacitor with the nitric acid electrolyte shows a value of leakage current of about one hundred times the initial value after 48 hours of operation even at a room temperature as shown in Table 2, and therefore nitric acid is not suitable for the electrolyte.

TABLE 2.—VARIATION IN CHARACTERISTICS OF TITANIUM ELECTRODE IN NITRIC ACID SOLUTION WITH RELATION TO TIME

| Time of application of D.C. 6 v. (hour) | 0 | 48 |
|---|---|---|
| Leakage current (μa.) | 1.3 | 95 |
| Capacity (μf.) | 22.2 | 22.7 |
| Loss (Ω−μf.) | 60 | 61 |

In contrast to the above solution, a marked feature of the aqueous solution of potassium nitrite is that it has a low freezing point of below −30° C. and, when used as an electrolyte of a titanium electrolytic capacitor, it does not corrode the oxide film over an extended period of time.

Table 3 shows a variation in the capacitor characteristics, with relation to time, of a slug-type titanium wet electrolytic capacitor with a 6-volt rating in which the aqueous solution of potassium nitrite is employed as an electrolyte.

TABLE 3.—VARIATION IN CHARACTERISTICS OF TITANIUM ELECTRODE IN POTASSIUM NITRITE SOLUTION WITH RELATION TO TIME

| Time of application of D. C. 6 v. (hour) | 0 | 528 |
|---|---|---|
| Leakage current (μa.) | 0.8 | 0.78 |
| Capacity (μf.) | 25.3 | 24.4 |
| Loss (Ω−μf.) | 209 | 117 |

The first feature of the electrolytic capacitor of the present invention resides in the use of the aqueous solution of potassium nitrite which is provided with the requisite for an electrolyte for use in a slug-type titanium wet electrolytic capacitor.

A next problem involved in making the capacitor of this type is related with selection of material of a negative electrode and an outer casing of the capacitor. In the capacitor of this type, the negative electrode and the outer casing must be made of a material which is sturdy, inexpensive and does not react with or is not corroded by the electrolyte in any environmental conditions. Since the potassium nitrite solution is selected as the electrolyte of the capacitor of the invention as described above, a material which is stable against the action of potassium nitrite solution must be selected. Such materials include titanium, zirconium, iron, silver and platinum, but iron is most suitable in respect to low cost. Iron is not suitable for an outer casing of a slug type tantalum wet electrolytic capacitor used with a solution of sulfuric acid or lithium chloride because iron is easily corroded by such solutions. Therefore, the second feature of the slug-type titanium electrolytic capacitor of the invention resides in the use of inexpensive iron as a material of the negative electrode or outer casing in contrast to the slug-type tantalum wet electrolytic capaictor in which an expensive material such as silver is used to provide an outer casing.

A further problem which arises in connection with the manufacture of the slug-type wet electrolytic capacitor is that the electrostatic capacity of the capacitor, when an anodically oxidized electrode is accommodated in its casing, is slightly less than the elestrostatic capacity when such electrode is disposed outside of the casing and measurement is done in an electrolytic bath of large volume with the electrode placed against a negative electrode of great area. This is a phenomenon often seen during the manufacture of a wet electrolytic capacitor with a great electrostatic capacity, and this drawback is generally eliminated by enlarging the area of a negative electrode disposed opposite the positive electrode. Table 4 shows a variation in the characteristics of the titanium wet electrolytic capacitor when negative electrode plates subjected to various surface treatments are incorporated therein.

TABLE 4.—RELATION BETWEEN CAPACITOR CHARACTERISTICS AND NEGATIVE ELECTRODES WITH VARIOUS TREATMENTS

| | Negative electrode | | | |
|---|---|---|---|---|
| | Platinized platinum | Chemically polished iron | Iron etched with nitric acid | Chemically polished titanium |
| Capacity (μf.) | 45.3 | 29.7 | 41.9 | 28.5 |
| Loss (Ω−μf.) | 122 | 223 | 182 | 198 |

The third feature of the inventive electrolytic capacitor resides in that, for the purpose of avoiding any loss of its capacity when the positive electrode is accommodated in its casing, the invention employs either a method in which a small piece of metal chemically etched to have a surface with minute indentations thereon is enclosed in the capacitor casing to act as the negative electrode or a method in which an iron casing having its inside face etched by a similar chemical treatment is utilized as the capacitor casing. In the former method, the negative electrode is welded fast to the inner bottom face of the casing.

One form of a method for manufacturing the electrolytic capacitor of the invention and performance thereof will be described hereinunder. Titanium powder of high purity with a grain size of 200 to 300 meshes is compressed by a press means to be molded into a shape of a cylinder with 2.5 millimeters in diameter and 7 millimeters in length. During the molding operation, one end of a titanium wire with a diameter of 0.5 millimeter is embedded in the electrode element being molded to provide a lead wire. The molded article is then sintered by being heated for ten minutes at a temperature of 1,000° C. in a vacuum sintering furnace held at a vacuum of the order of $10^{-5}$ mm. Hg to obtain a titanium positive electrode of porous nature. This electrode is soaked in an electrolytic bath consisting of a melt of sodium nitrate maintained at a temperature of about 320° C. and is subjected to anodic oxidation for about one hour at a formation voltage of 40 volts.

In FIG. 1, there is shown an electrolytic capacitor which contains therein a positive electrode 1 obtained by such treatment. The positive electrode 1, paper spacers 2 and a negative electrode 3, which is a small piece of chemically etched iron, are accommodated in an iron casing 4. Then, a 60% aqueous solution of potassium nitrite 5 is filled in the casing 4, and the open end of the casing 4 is sealed by a rubber packing 6 and a cap 7 of epoxy resin according to a conventionally employed practice. Where the sealing cap portion has a sturdier structure and there is no fear of direct contact between the positive electrode in the casing and the inside wall of the casing due to vibration, the paper spacer 2 and the negative electrode piece 3 may be dispensed with and the inside face of the casing 4 may be chemically etched as described above.

The performance of the electrolytic capacitor of the present invention manufactured by the above-described method will be explained with reference to FIG. 2 and Table 5. FIG. 2 shows the temperature characteristics of the inventive slug type titanium wet electrolytic capacitor having a 6 v.-25 µf. rating compared with that of a similar electrolytic capacitor. Or more precisely, the curve 1 in FIG. 2 represents the characteristics of the inventive electrolytic capacitor which includes the electrolyte of potassium nitrite solution, while the curve 2 represents the characteristics of a similar capacitor including an electrolyte of sodium nitrate solution. It will be apparent from FIG. 2 that the electrolytic capacitor of the present invention has a wider operating temperature range which extends to low temperatures. Table 5 shows the characteristics of the inventive capacitor with the 6 v.-25 µf. rating before and after a test in which a voltage of 6 volts is continuously applied to the capacitor for 1,000 hours at an ambient temperature of 65° C. Values after the test clearly show that no deterioration whatsoever of the characteristics of the inventive capacitor takes place after a long period of operation and it will be apparent that the inventive electrolytic capacitor is sufficiently suitable for practical applications.

TABLE 5.—LIFE TEST OF TITANIUM WET ELECTROLYTIC CAPACITOR WITH POTASSIUM NITRITE ELECTROLYTE AND IRON CASING (VOLTAGE OF 6 VOLTS APPLIED FOR 1,000 HOURS AT 65° C.)

|  | Before Test | After Test |
| --- | --- | --- |
| Leakage current (µa.) | 0.25 | 0.18 |
| Capacity (µf.) | 29.3 | 32.2 |
| Loss (Ω—µf.) | 179 | 174 |

Heretofore, an electrolyte essentially consisting of a non-aqueous solution such as ethylene glycol has generally been used in the manufacture of a titanium wet electrolytic capacitor due to a poor corrosion resisting property of an anodic oxidation film of titanium against an ordinary electrolyte. Such non-aqueous electrolyte, having a high electric resistance, has been a cause of an excessively great dielectric loss factor when adapted to cooperate with a slug-type positive electrode having many pores therein, and thus slug-type titanium wet electrolytic capacitors have not been put into practical use. In contrast thereto, the electrolytic capacitor according to the present invention is obtained by the unique combination of the method of formation of the positive electrode in a molten salt for obtaining an oxide film with a high withstand voltage and a great dielectric constant, the use of the potassium nitrite electrolyte having a high electrical conductivity and a low freezing point and exerting no corroding action to the oxide film, the use of the iron casing which is satisfactory in respect of its corrosion resisting property and cost, and the method of surface treatment on the negative electrode for preventing any loss in the capacity. It will be appreciated that the slug type titanium wet electrolytic capacitor of the present invention has a wide operating temperature range and a great capacity in spite of a small size and thus is quite suitable for practical use.

What is claimed is:

1. A wet slug-type electrolytic capacitor comprising an electrolyte, a positive electrode made of a sintered block of titanium having thereon a titanium oxide film in a rutile type crystal structure, a negative electrode, and a container for said electrolyte and said electrodes, said electrolyte comprising an aqueous solution of potassium nitrite.

2. A wet slug-type electrolytic capacitor as defined in claim 1 wherein said electrolyte comprises 55 to 70 percent by weight of potassium nitrite and 30 to 45 percent by weight of water.

3. A wet slug-type electrolytic capacitor as defined in claim 1 wherein said container and said negative electrode are made of iron.

4. A wet slug-type electrolytic capacitor according to claim 1 in which said negative electrode has an etched surface providing minute indentations therein thereby enlarging the effective surface area of said electrode.

5. A method for making a wet electrolytic capacitor containing an electrolyte of an aqueous solution of potassium nitrite, a positive electrode, a negative electrode and a container for said electrolyte and said electrodes, the steps of forming said positive electrode by sintering a block of titanium and forming by an anodic oxidation a titanium oxide film thereon in a rutile type crystal structure forming said negative electrode of iron and etching said electrode with nitric acid for enlarging a surface area thereof, and placing said electrodes and electrolyte inside said container.

6. A method for making a wet electrolytic capacitor according to claim 5 in which said sintered titanium positive electrode is subjected to anodic oxidation in a molten salt of inorganic material.

7. A method for making a wet electrolytic capacitor according to claim 6 in which said molten salt is prepared by heating at least one nitrate to melting.

References Cited

UNITED STATES PATENTS

| | | | |
| --- | --- | --- | --- |
| 732,631 | 6/1903 | Hambuechen | 317—233 |
| 2,005,279 | 6/1935 | Van Geel | 317—230 |
| 2,030,122 | 2/1936 | Straub | 317—230 |
| 2,066,912 | 1/1937 | Ruben | 317—230 |
| 2,299,228 | 10/1942 | Gray | 317—230 |
| 2,846,624 | 8/1958 | Hilton | 317—230 |
| 2,885,607 | 5/1959 | Bugel | 317—230 |
| 2,943,031 | 6/1960 | Wainer | 317—230 |

JAMES D. KALLAM, *Primary Examiner.*